(12) United States Patent
Cullen et al.

(10) Patent No.: US 8,550,914 B2
(45) Date of Patent: Oct. 8, 2013

(54) RECORDING AUDIO IN ORDER TO AFFECT GAMEPLAY EXPERIENCE

(75) Inventors: Geoff Cullen, Hove (GB); Serkan Hassan, Hove (GB); Steve Rockett, Lewes (GB); Ciaran Rooney, Brighton (GB); Erasmus Talbot, Brighton (GB)

(73) Assignee: Disney Enterprises, Inc., Burbank, CA (US)

( * ) Notice: Subject to any disclaimer, the term of this patent is extended or adjusted under 35 U.S.C. 154(b) by 189 days.

(21) Appl. No.: 13/083,145

(22) Filed: Apr. 8, 2011

(65) Prior Publication Data
US 2012/0258797 A1    Oct. 11, 2012

(51) Int. Cl.
*A63F 9/24* (2006.01)
*G06F 19/00* (2011.01)

(52) U.S. Cl.
USPC .............................................. 463/35; 463/30

(58) Field of Classification Search
USPC ....................................... 463/35, 30
See application file for complete search history.

(56) References Cited

U.S. PATENT DOCUMENTS
2008/0177730 A1* 7/2008 Endo et al. ......................... 707/5

OTHER PUBLICATIONS

King Kool, "GameFAQs: Runaway : A Road Adventure (PC) FAQ/ Walkthrough", 2007, available at <<www.gamefaqs.com/pc/ 431325-runaway -a-road-adv enture/f aqs/37018>>.*
"Directional Microphone", Feb. 20, 2009, Metal Gear Wiki, available at <<http://web.archive.org/web/20090220164932/http://metalgear. wikia.com/wiki/Directional_Microphone>>.*
T-0815, Screenshots of Runaway, May 25, 2010, available at <<http://www.youtube.com/watch?v=zz4p9B9OE-g>>.*

* cited by examiner

*Primary Examiner* — David Lewis
*Assistant Examiner* — Werner Garner
(74) *Attorney, Agent, or Firm* — Patterson & Sheridan, LLP (57) ABSTRACT

Techniques are described for altering the gameplay of a computer game based on audio content recorded within the virtual world of the computer game. An indication is received of audio content to record within the computer game, and the indicated audio content is then recorded. Subsequently, a selection of the recorded audio content to playback within the virtual world is received. Upon playing the recorded audio content in the virtual world, embodiments affect one or more gameplay elements of the computer game, based on the playback of the recorded audio content.

19 Claims, 7 Drawing Sheets

RECORDING AUDIO IN ORDER TO AFFECT GAMEPLAY EXPERIENCE

BACKGROUND

1. Technical Field

The present disclosure is directed to computer games, and in particular to recording audio within a computer-based game.

2. Description of the Related Art

Audio, whether in the form of a sound effect or a musical composition, plays an integral role in a wide array of computer games throughout the computer gaming world. Audio effects are often used in computer gaming to, for instance, give life to a graphical animation such as the casting of a spell, enhance the mood of a dramatic scene, or even to narrate a story through the use of voice acting. Additionally, many games also incorporate advanced sound techniques into the gameplay in order to create an immersive gaming experience for the user. For instance, many games incorporate the use of multichannel surround sound, which adds a directional component to sound effects within the virtual gameplay environment and which enhances the user's gameplay experience and immersion into the virtual world. As such, audio continues to play an ever-increasing role across all genres of computer games.

SUMMARY

Embodiments of the invention provide a method, computer-readable storage medium and system. The method, computer-readable storage medium and system include receiving a first request to record audio content at a first location in a virtual world. The method, computer-readable storage medium and system further include, upon receiving the first request, recording audio content at the first location in the virtual world. Additionally, the method, computer-readable storage medium and system include receiving a second request to playback the recorded audio content at a second location in the virtual world. The method, computer-readable storage medium and system also include upon receiving the second request, affecting, by operation of one or more computer processors, one or more elements of gameplay based on the playback of the recorded audio content.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention are directed to recording audio content in a virtual world of a computer game. As an example, the user may record the sound of a dog barking in the virtual world. Additionally, particular embodiments of the invention may consider other factors when recording the audio content, such as a direction of the virtual recording device in the virtual world and properties of the virtual environment where the recording is occurring. Embodiments also affect the gameplay of the computer game, based on the recorded audio content. For instance, embodiments may use the recorded audio content in conjunction with a virtual audio playback device in the computer game, enabling a user to effectively imitate the recorded sound in the virtual world. Continuing the above example, if the user's virtual house is being burglarized in the virtual world, the user may playback the recorded sound of a dog barking to chase off the burglars. Advantageously, by doing this, embodiments of the invention may provide a dynamic and interesting gaming environment through the recording and use of user-selected recorded audio content.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
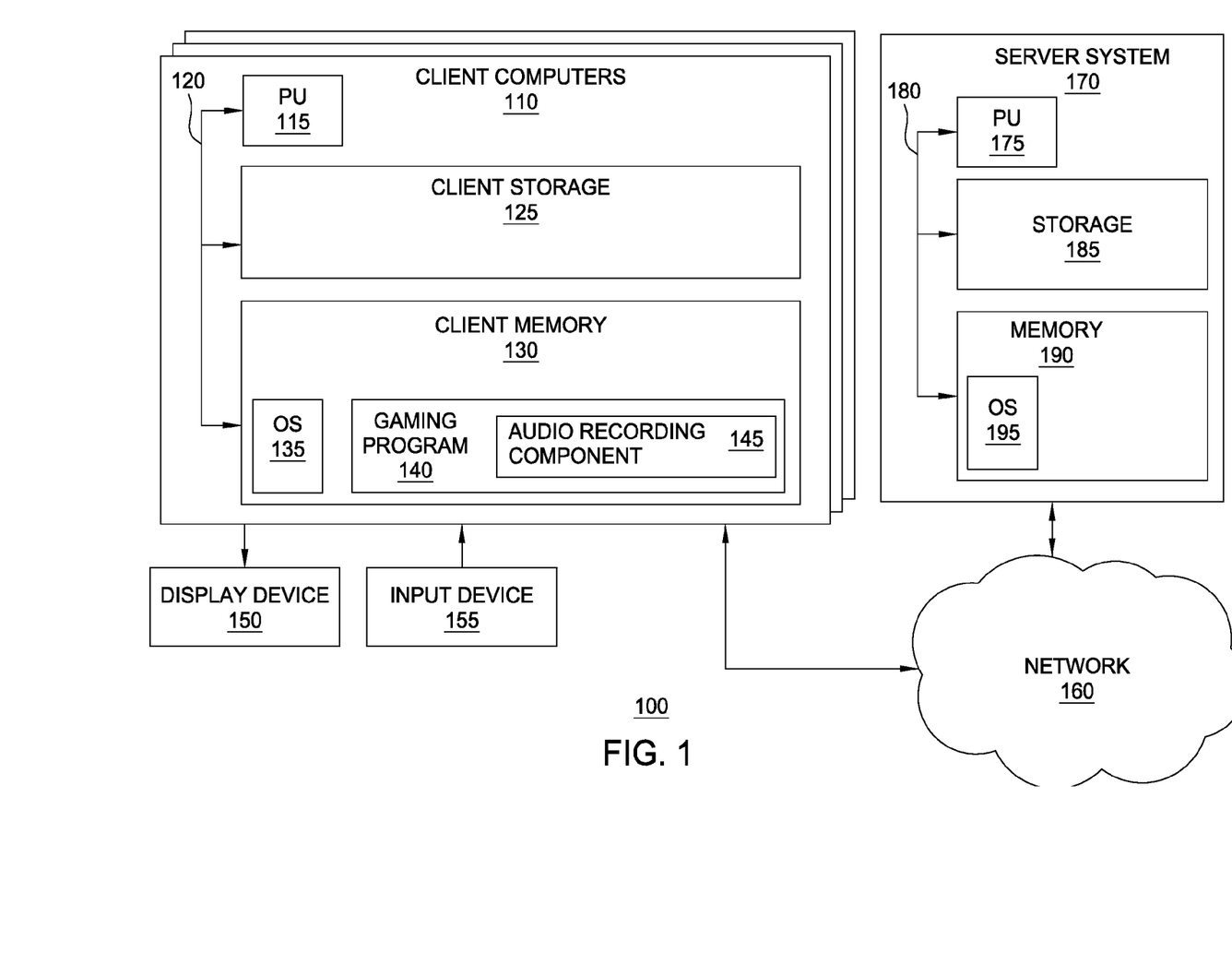
FIG. 1 is a block diagram illustrating a client-server view of a computing environment, according to one embodiment of the present invention.

FIG. 1 is a block diagram illustrating a client-server view of a computing environment, according to one embodiment of the present invention. As shown, computing environment 100 includes client computers 110, a network 160, and a server system 170. In one embodiment, the environment 100 may include existing computer systems, e.g., desktop computers, server computers, laptop computers, tablet computers, and the like. The computing environment 100 illustrated in FIG. 1, however, is merely an example of one computing environment in which embodiments of the present invention may be used. Embodiments of the present invention may be implemented differently, regardless of whether the computer systems are complex multi-user computing systems, such as a cluster of individual computers connected by a high-speed network, single-user workstations, or network appliances lacking non-volatile storage. Further, while FIG. 1 illustrates a client-server model, other models are contemplated such as a peer-to-peer model.

As shown, each client computer 110 includes a processing unit 115, which obtains instructions and data via a bus 120 from a client memory 130 and client storage 125. Processing unit 115 is a programmable logic device that performs instruction, logic, and mathematical processing, and may be representative of one or more CPUs and/or GPUs. Client storage 125 stores application programs and data for use by client computer 110. The memory 130 is any memory sufficiently large to hold the necessary programs and data structures. Memory 130 could be one or a combination of memory devices, including Random Access Memory, nonvolatile or backup memory (e.g., programmable or Flash memories, read-only memories, etc.). In addition, memory 130 and storage 125 may be considered to include memory physically located elsewhere; for example, on another computer coupled to the client computer 110 via bus 120.

Client storage 125 includes hard-disk drives, flash memory devices, optical media and the like. Client computer 110 is operably connected to the network 160. Client memory 130 includes an operating system (OS) 135 and a gaming program 140. Operating system 135 is the software used for managing the operation of the client computer 110. Examples of OS 135 include UNIX, a version of the Microsoft Windows® operating system, and distributions of the Linux® operating system. (Note: Linux is a trademark of Linus Torvalds in the United States and other countries.) The gaming program 140 in turn contains an audio recording component 145.

The audio recording component 145 generally enables users to record audio content within a virtual world of the gaming program 140. The recorded audio content may then be used to affect the gameplay of the gaming program 140. For instance, a user may record a sound of someone screaming in the virtual world. As an example, the user may record the sound in a first location of the virtual world, and may then playback the recorded sound in a second location of the virtual world that is different from (or alternatively, the same as) the first location in the virtual world. The playback of the recorded audio content may be used to affect elements of the virtual world. For instance, the user may playback the recorded scream in order to draw the attention of a virtual enemy in the virtual world. Additionally, in one embodiment of the invention, the user may remotely playback the recorded audio content. For instance, the user may place a virtual playback device in a first location in the virtual world, and may then move the user's avatar to a second location in the virtual world. If the user then plays the recorded audio content through the virtual playback device in the first location, this may attract virtual enemies towards the first location in the virtual world as they investigate the source of the scream, and away from the user's position at the second location in the virtual world. Advantageously, by doing this, embodiments of the invention may create dynamic puzzles for the user to solve in the virtual world, thus enhancing the gameplay experience for the user.

In one embodiment, each client is a dedicated gaming console, such as a Sony PS3® or Nintendo Xbox 360®, capable of executing the gaming program 140. In another embodiment, each client is a general purpose computer configured to run any variety of gaming and non-gaming software. The game may be viewed on a display device 150, such as an LCD, LED or CRT monitor display, and controlled using input devices 155 which may be, e.g., a keyboard, mouse and/or a controller.

As shown, the server system 170 includes the same basic hardware elements as the client computers 110. Specifically, the server system 170 includes a processing unit 175 (representative of one or more CPUs and/or GPUs), a memory 190 and storage 185 connected via a bus 180. The server system 170 may be operably connected to the network 160, which generally represents any kind of data communications network. Accordingly, the network 160 may represent both local and wide area networks, including the Internet. In one embodiment, the server system 170 hosts an on-line gaming environment to which one or more of the client computers 110 connect. In this case, server-side gaming software may be located on the server system 170 and cooperates with client-side gaming software (e.g., game program 140) located on the respective client computers 110.

It is specifically contemplated that embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a computer game configured to run an audio recording component) or related data available in the cloud. For example, the computer game configured with the audio recording component could execute on a computing system in the cloud and enable users to record sound within a virtual world of the computer game. In such a case, an audio analysis component of the computer game could analyze the recorded audio content to determine acoustic characteristics of the recorded audio content and store the determined acoustic characteristics at a storage location in the cloud. The computer game may then alter the gameplay experience of the user playing the game, based on the determined acoustic characteristics for the recorded audio content. Doing so allows a user to access the recorded audio content information from any computing system attached to a network connected to the cloud (e.g., the Internet).

Figure 2:
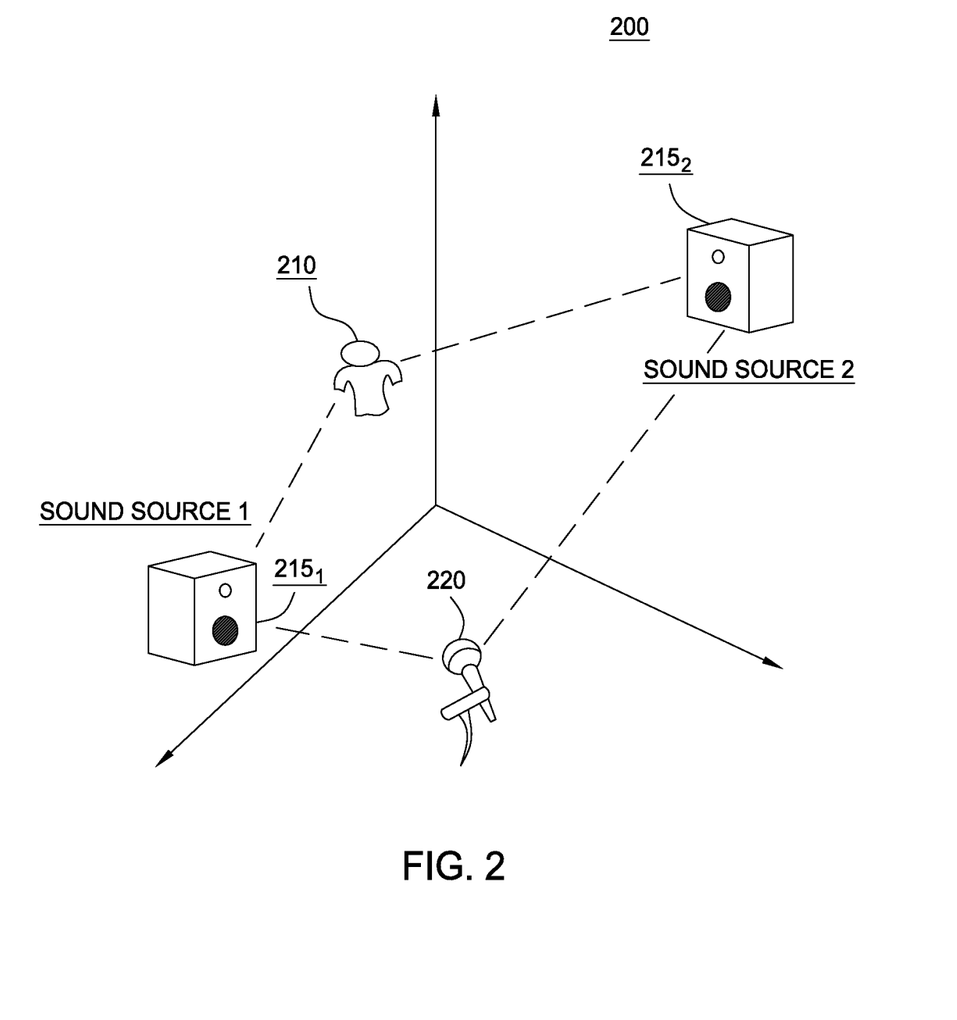
FIG. 2 is a diagram representing audio sources in a three-dimensional scene, according to one embodiment of the present invention.

FIG. 2 is a diagram representing audio sources in a three-dimensional scene, according to one embodiment of the present invention. For the purposes of this example, assume that the three-dimensional scene 200 shown here is representative of a virtual world provided by a computer gaming program (e.g., gaming program 140) that is configured to use multichannel surround sound. As shown, the three-dimensional scene 200 includes a user's avatar 210, two sound sources 215 and a virtual sound recording device 220. Generally, the sound sources 215 are representative of any entities within the virtual world from which sound originates. For instance, sound source 1 $215_1$ may be a virtual dog barking in the virtual world, while sound source 2 $215_2$ may be a non-player character (also referred to herein as "NPC") in the virtual world saying a particular phrase. The virtual sound recording device 220 may generally be activated by the user to record audio content occurring at the location of the sound recording device 20 in the virtual world. Furthermore, while the three-dimensional scene is shown as containing only two sound sources 215, the depicted example is without limitation and is shown for illustrative purposes only. Moreover, one of ordinary skill in the art will quickly recognize that embodiments of the invention may be used with any virtual world containing any number of sound sources 215, consistent with the functions described herein.

As discussed above, embodiments of the invention may enable the user to record audio content within the virtual world. For instance, in one embodiment, the user 210 may record sound at the position of the user's avatar 210 in the virtual world. In this example, the recorded audio content may include equal parts of the sound produced by sound source 1 $215_1$ and sound source 2 $215_2$. According to another embodiment of the invention, the user may record sound in a particular direction from the avatar's 210 position within the virtual world. This may be done, for instance, by facing the user's avatar 210 in the direction in which the user wishes to record sound. In such a scenario, sounds originating from the specified direction may be given more emphasis in the recording. For example, if the user's avatar is facing sound source 1 $215_1$ when recording, the recorded audio content may clearly capture the sound produced by sound source 1 $215_1$, while the sound produced by sound source 2 $215_2$ may be much softer than it would be if the user's avatar were facing sound source 2 $215_2$. In other words, the directionality and distance of the sound source relative to the user's avatar may be accounted for. Likewise, obstructions, or intermediary media through which the sound must propagate, can also be accounted for so that the received sound is appropriately affected (e.g., by muffling the sound, changing its pitch or introducing reverberation). In one embodiment, the recording may include only sounds originating from the specified direction. Additionally, in another embodiment, the user may specify the direction in which to record audio content within the virtual world by controlling the avatar 210 to point a virtual directional microphone in a particular direction.

The scene 200 also contains an audio recording device 220. According to one embodiment of the present invention, the audio recording device 220 may be placed within the virtual world by the user. The user may then use the audio recording device 220 for remotely recording audio content within the virtual world. For instance, the user may place the audio recording device 220 in a hidden location within a room of a virtual building. The user may then direct the avatar 210 to a different location in the virtual world, and may remotely activate the audio recording device 220 in order to capture audio content from within the room of the virtual building. In particular embodiments, the audio recording device 220 may be activated based on the occurrence of a triggering event. For instance, in one embodiment, the audio recording device 220 is activated based on the movement of another avatar or non-player character, such as when the other avatar passes by the audio recording device 220 within the virtual world. As another example, the audio recording device 220 could be activated at particular times, when a particular sound the user is interested in capturing (e.g., as indicated using user-specified criteria) occurs, or could be triggered based on an entity within the virtual world (e.g., another user's avatar) stepping on top of the audio recording device 220.

Additionally, similar to as discussed above, the recording may be omnidirectional in nature, recording sounds equally from all directions. In one embodiment, the recording produced by the audio recording device 220 may have a directional component to it as well. Such a directional component may be controlled, for instance, by the placement of the audio recording device 220 by the user (e.g., the orientation of the audio recording device 220 when placed by the user). Of course, all of these examples are provided for illustrative purposes only and are without limitation, and one of ordinary skill in the art will quickly recognize that audio content may recorded within the virtual world in any number of other ways, consistent with the functionalities described herein.

Figure 3:
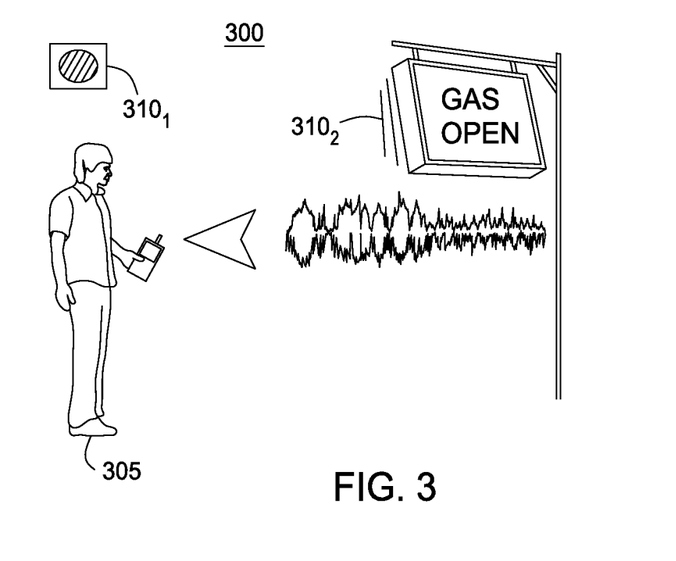
FIG. 3 is a screenshot of an avatar recording audio content in a virtual world, according to one embodiment of the present invention.

FIG. 3 is a screenshot of an avatar recording audio content in a virtual world, according to one embodiment of the present invention. As shown, the screenshot 300 includes a user's avatar 305 and two sound sources 310. For instance, the sound source $310_1$ represents a virtual speaker in the virtual world, while the sound source $310_2$ represents a virtual sign blowing in the wind in the virtual world. As discussed above, according to embodiments of the invention, the user may (e.g., using an interface provided by gaming program 140) record audio content within the virtual world using a variety of techniques, including an omnidirectional virtual recording device (i.e., the recording captures sounds at the point in the virtual world from all angles) and a unidirectional virtual recording device (i.e., the user specifies a particular direction from which to record sounds in the virtual world).

Once recorded, the user may replay the recorded audio content within the virtual world to affect gameplay of the computer game. As one example, the gaming program 140 may task the user with recording the sound of a particular object in the virtual world (e.g., the gas open sign) by showing a picture of the object to the user. To solve the puzzle, the user would locate the pictured object within the virtual world, record audio content associated with the pictured object, and return to the origin of the puzzle to playback the recorded sound. Advantageously, by doing this, embodiments of the invention may present the user with dynamic and creative puzzles to solve, thus creating an improved gameplay experience.

Figure 4:
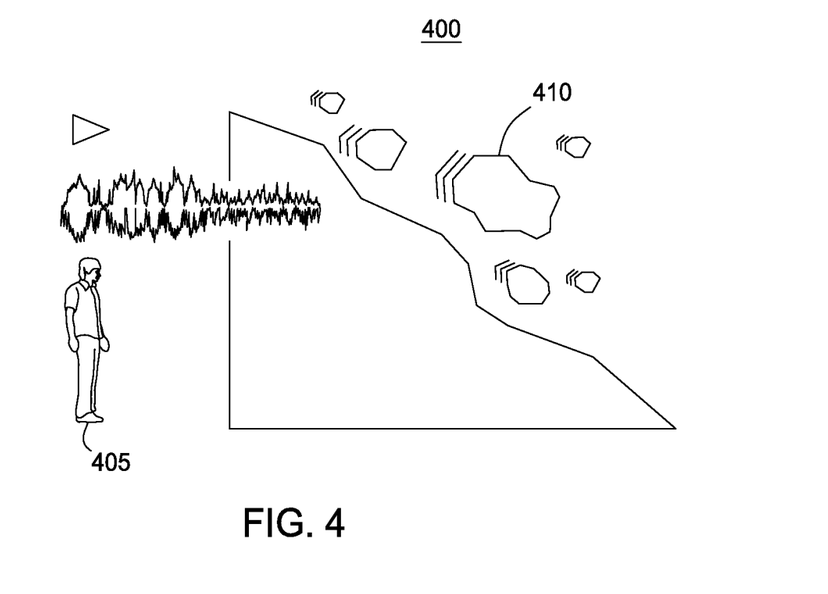
FIG. 4 is a screenshot of an avatar recording audio content in a virtual world, according to one embodiment of the present invention.

Additionally, recorded audio content may be used to affect gameplay in a number of other ways. For instance, FIG. 4 is a screenshot of an avatar recording audio content in a virtual world, according to one embodiment of the present invention. As shown, the screenshot 400 includes a user's avatar 405 and a rockslide 410, where a series of rocks are rolling down a hill in the virtual world. As discussed above, the user may use techniques described above to record the sound of the rocks as they roll down the hill. Once the audio content is recorded, the user may then playback the recorded audio content to affect one or more gameplay elements. For instance, the gaming program 140 may be configured such that the playback of audio content associated with a particular event may trigger another occurrence of the event. In other words, returning to the present example, the recording of the rockslide 410 may be played back to cause other rocks to dislodge and create a second rockslide within the virtual world.

As an example, the avatar 405 may encounter a mountain path in the virtual world that is blocked by a large amount of rocks. In such an example, the user may control the avatar 405 to playback the recorded audio content of the rockslide 410, which may cause the large amount of rocks blocking the avatar's path to slide down the mountain. Advantageously, by doing this, embodiments of the invention provide a creative and dynamic gameplay experience, by encouraging the user to explore the virtual world and gain various powers by recording audio content throughout the virtual world.

Figure 5:
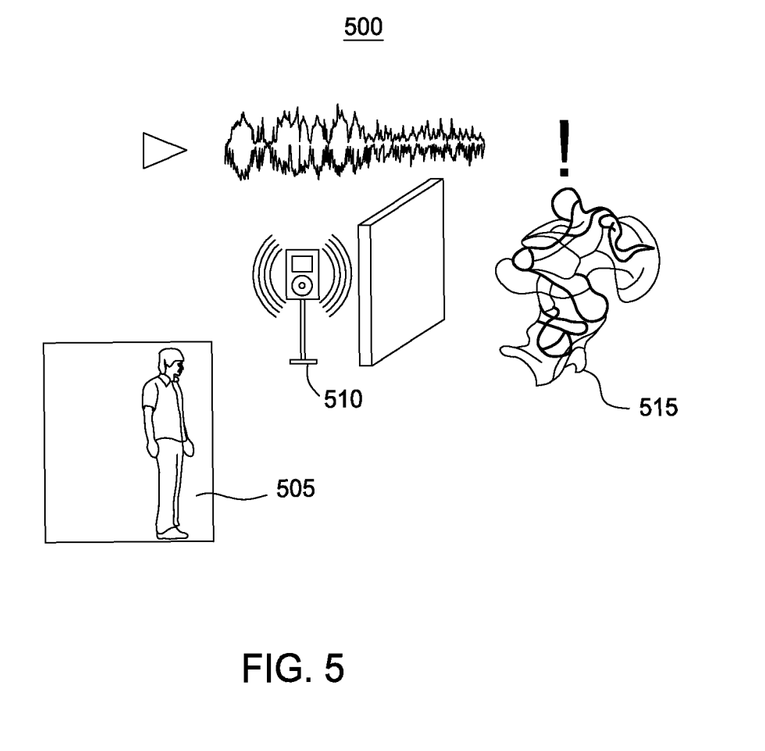
FIG. 5 is a screenshot of an avatar using recorded audio content in a virtual world, according to one embodiment of the present invention.

According to another embodiment of the invention, the recorded audio content may also be used to influence or distract non-player characters ("NPCs") within the virtual world. FIG. 5 is a screenshot of an avatar using recorded audio content in a virtual world, according to one embodiment of the present invention. As shown, the screenshot 500 includes a user's avatar 505, a remote audio playback device 510 and a NPC 515 within a virtual world. For purposes of this example, assume that the avatar 505 wishes to avoid a confrontation with the NPC 515, and further assume that the avatar 505 has previously recorded the sound of a woman screaming in the virtual world. Here, the user may use the remote playback device 510 to playback the sound of the woman screaming, which may cause the NPC 515 to be alarmed and investigate the source of the scream. As a result, the avatar 505 may sneak past the NPC 515 while the NPC 515 is distracted investigating the scream.

As a second example, embodiments may also be used to enable an avatar 505 to record audio content in order to steal a particular power (e.g., a sonic weapon) from the NPC 515 within the virtual world. In such an example, the NPC 515 may lose the ability to use the sonic weapon once the avatar 505 has recorded sound effects associated with the weapon. The user could then, for instance, use the stolen sonic weapon against the NPC 515 (or other entities within the virtual world) by playing the recorded audio content back using the remote playback device 510. Moreover, it is contemplated that different selections of recorded audio content for playback through the remote playback device 510 may influence the NPC 515 in different ways. As an example, rather than the recorded sound of a woman screaming, the user may choose to playback a recording of a lullaby, captured from another location within the virtual world. The playback of the lullaby through the remote playback device 510 may, for instance, cause the NPC 515 to doze off to sleep, allowing the user to sneak past the sleeping NPC 515 without confrontation. As such, embodiments of the invention may advantageously promote creative gameplay by allowing the user to deal with situations in the virtual world in a variety of different ways. As a further advantage, embodiments may also increase the replayability of the computer game, as each time the user may be encouraged to solve puzzles in a different way.

Figure 6:
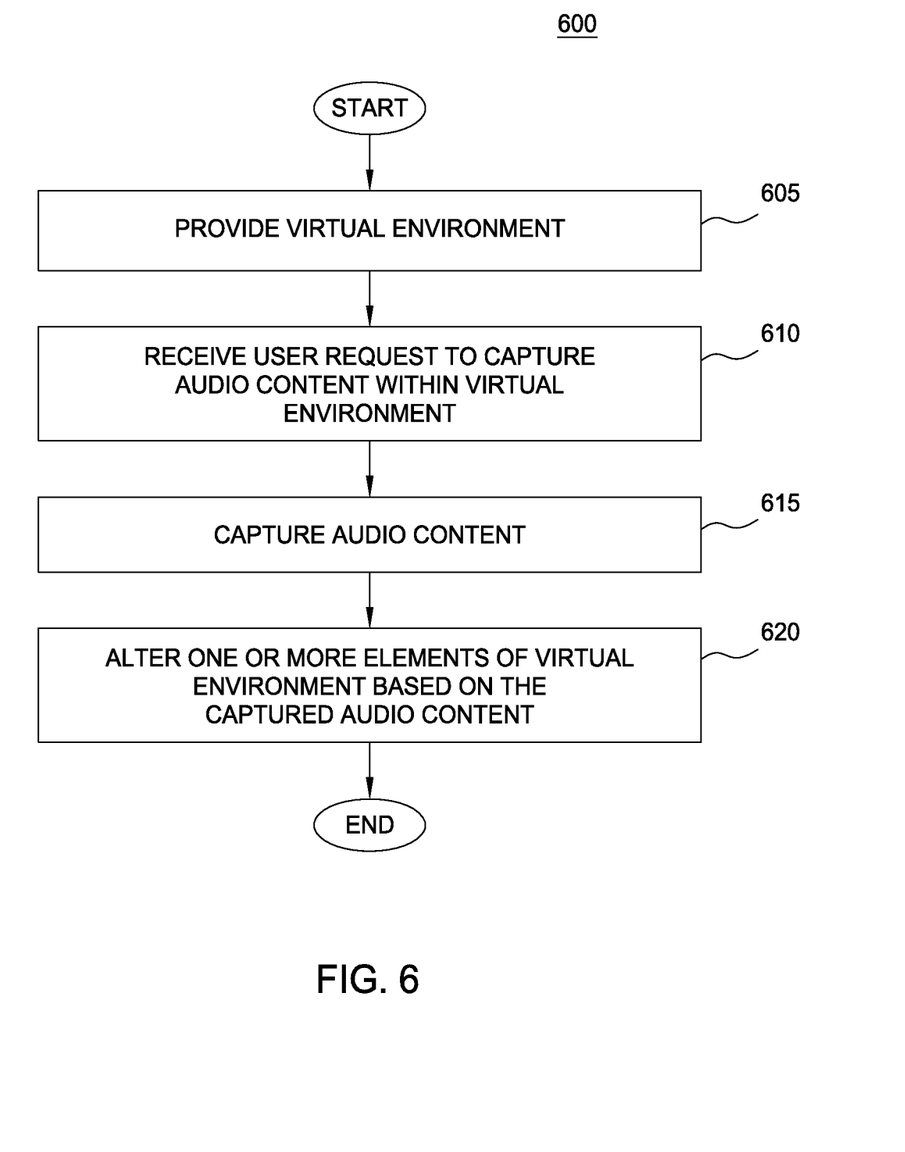
FIG. 6 is a flow diagram illustrating a method for affecting gameplay using recorded audio content, according to one embodiment of the present invention.

FIG. 6 is a flow diagram illustrating a method for affecting gameplay using recorded audio content, according to one embodiment of the present invention. As shown, the method 600 begins at step 605, where a gaming program provides a virtual environment. It is broadly contemplated that embodiments of the invention may be used with a wide variety of computer games. Accordingly, the virtual environment (also referred to herein as a "virtual world") provided here may be any sort of virtual setting capable of performing the functions described herein. Additionally, although embodiments of the invention may be described herein with respect to a particular virtual environment, such descriptions are without limitation and are for illustrative purposes only.

The gaming program 140 then receives a request from a user playing the game to capture audio content within the virtual environment (step 610). Such a request may be generated, for example, upon the user clicking a particular button on the user interface or pressing a particular button on a controller for the game. The audio content to be recorded may be sounds occurring at the user's avatar's position in the virtual environment. For instance, the request may specify to record the sound of a virtual dog barking near the user's avatar's position in the virtual world. Additionally, in one embodiment of the invention, the request may further specify a direction from the avatar's position in which to record audio content. For instance, where the gaming program 140 is capable of producing multichannel surround sound, the audio content received in a first direction from the avatar's position may be substantially different from audio content received in a second direction from the same position.

Responsive to receiving the request from the user, the gaming program 140 records the audio content within the virtual environment (step 615). In one embodiment of the invention, the gamin program 140 may record audio content for a predefined period of time after receiving the request. For example, for each request to record audio content received from the user, the gaming program 140 may record 10 seconds of audio content within the virtual world. In an alternate embodiment, the request may specify a period of time for which audio content should be recorded. In yet another embodiment, the gaming program 140 may begin recording audio content responsive to receiving the user request, and may continue recording audio content until a second request is received from the user, indicating that the gaming program 140 should stop recording.

Once the audio content within the virtual world is captured, the gaming program 140 alters one or more elements of the virtual world based on the recorded audio content (step 620). For instance, the user may select the captured audio content for playback within the virtual world, and the gaming program 140 may affect one or more gameplay elements responsive to such playback. Using the aforementioned example of a user recording the sound of a virtual dog barking within the virtual world, the user may then affect one or more other elements of the virtual world by playing back the recorded sound. For instance, the user may play the recorded sound of the dog barking to frighten burglars away from the user's virtual house in the virtual world.

As a second example, the recorded audio content may be used to solve puzzles in the virtual world. For instance, the gaming program 140 may present the user with a riddle to which the answer is "dog". However, rather than typing the answer or selecting it from a menu, the gaming program 140 may require the user to record audio content representing the answer (i.e., a dog) and to play this recorded audio content back in order to solve the riddle. Of course, the aforementioned examples are without limitation and are for illustrative purposes only. Furthermore, one of ordinary skill in the art will quickly recognize that any number of other gameplay elements may be affected using the recorded audio content, consistent with the spirit and scope of the present disclosure.

Figure 7:
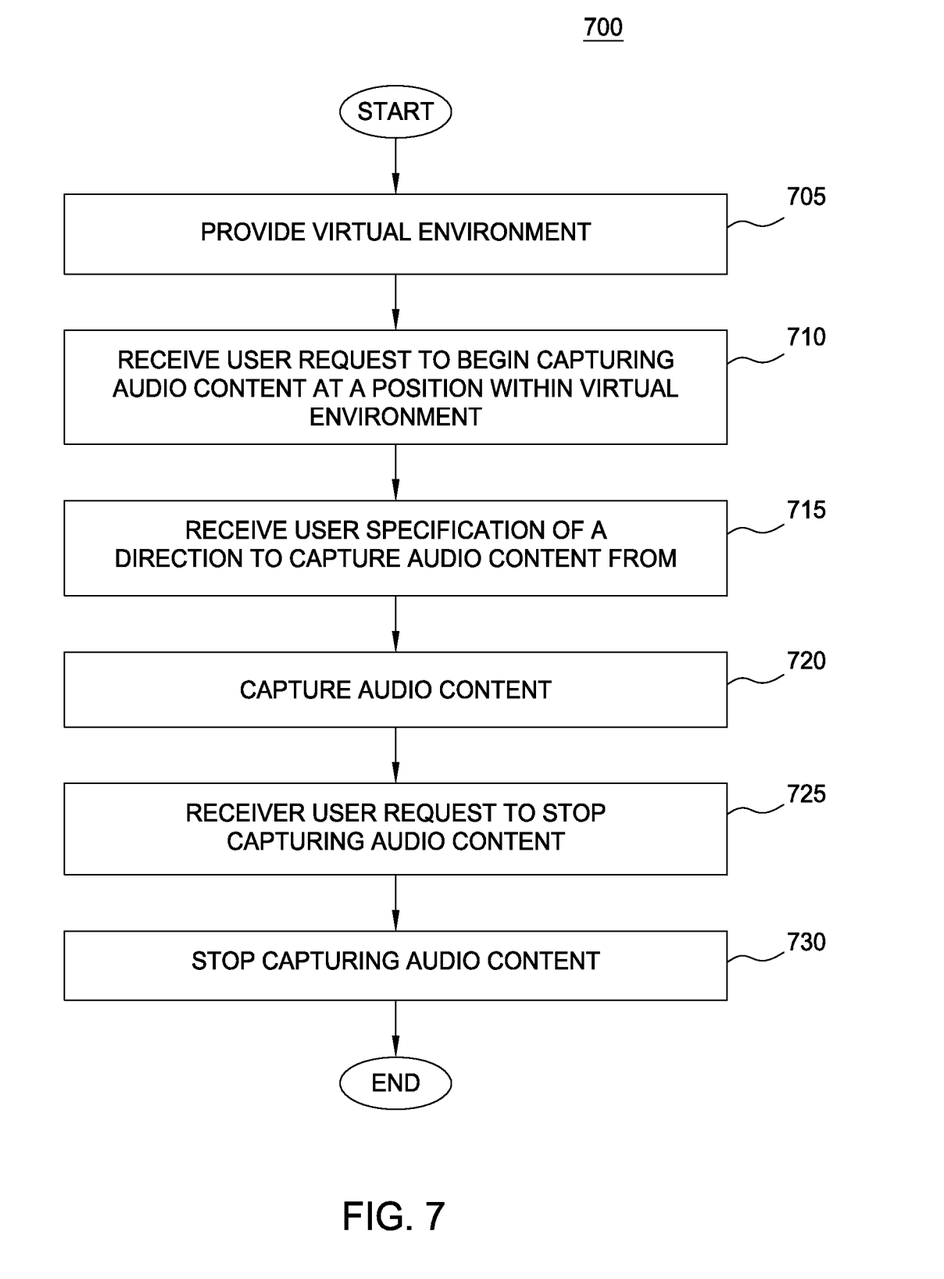
FIG. 7 is a flow diagram illustrating a method for recording audio content in a virtual world, according to one embodiment of the present invention.

FIG. 7 is a flow diagram illustrating a method for recording audio content in a virtual world, according to one embodiment of the present invention. As shown, the method 700 begins at step 705, where a gaming program 140 provides a virtual world. As discussed above, the gaming program 140 may be of any theme and type capable of performing the functions described herein. The gaming program 140 then receives a request from a user playing the computer game to begin capturing audio content at a position within the virtual world (step 710). As an example, the position at which to begin recording may be a current location of the user's avatar in the virtual world. As a second example, the position may be the location of a virtual recording device placed by the user in the virtual world.

The gaming program 140 then receives a user-specified direction in which to capture audio content from in the virtual world (step 715). Examples of such a directional audio recording are discussed in further detail above in the discussion of FIG. 2. In one embodiment, the user may specify the direction in which to record audio content from as part of the request to begin recording audio content. Once the position and direction are specified, the audio recording component 145 captures audio content within the virtual world at the specified position and in the specified direction (step 720). According to the depicted embodiment of the invention, the audio recording component 145 continues capturing audio content until a user request to stop capturing audio content is received (step 725). Responsive to receiving the user request, the audio recording component 145 stops capturing the audio content (step 730), and the method 700 ends. The audio recording component 145 may then store the captured audio content for later playback by the user within the virtual world.

In one embodiment of the invention, once the audio recording component 145 has captured the audio content, the user may submit a request to transfer the recorded audio content to another user. In such a scenario, the audio recording component 145 may then transfer the recorded audio content to the other user of the computer game. According to one embodiment of the invention, the user may lose access to the recorded audio content upon trading the audio content to another user. In another embodiment, the user may retain access to the recorded audio content, thus allowing the user to freely trade recorded audio content with other users. Upon receiving the transferred recorded audio content, the other user may then playback the content to affect one or more gameplay elements of the computer game. Advantageously, by doing this, users may collaborate and trade recorded audio content within the computer game, thereby providing a more socially involved gameplay experience for the users.

Figure 8:
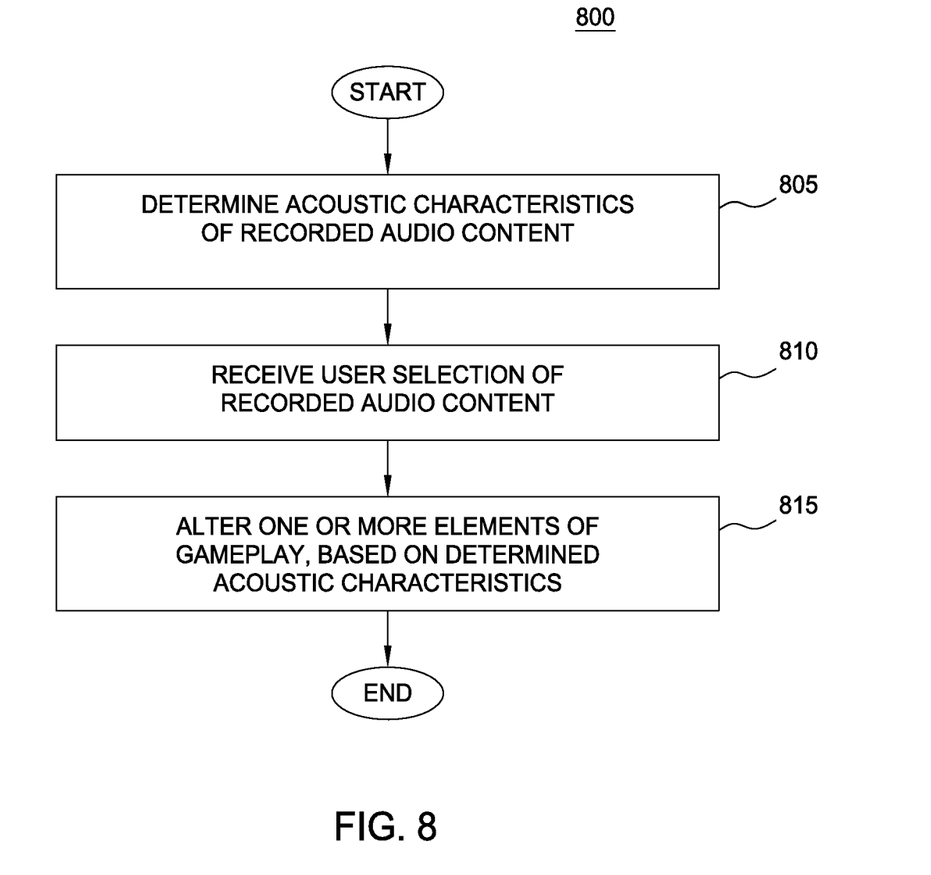
FIG. 8 is a flow diagram illustrating a method for affecting gameplay using recorded audio content, according to one embodiment of the present invention.

Once the user has recorded at least one selection of audio content within the virtual world, the user may then playback the recorded audio content to affect one or more elements of gameplay. FIG. 8 is a flow diagram illustrating a method for affecting gameplay using recorded audio content, according to one embodiment of the present invention. As shown, the method 800 begins at step 805, where the audio recording component 145 analyzes the recorded audio content to determine acoustic characteristics of the recorded audio content. Generally, the acoustic characteristics may be any characteristic, characterization or measurement that may be derived from a selection of audio content. Such acoustic characteristics may include a measurement of, for example, frequency distribution (i.e., the spectral content of the audio content).

For instance, the audio recording component 145 may determine the frequency distribution of recorded audio content by performing a form of Fourier Transform, such as Fast Fourier Transform ("FFT") or Time-Based Fast Fourier Transform ("TFFT"), on the recorded audio content. Additionally, other types of sound analysis could be performed on the imported audio content, according to embodiments of the present invention. Examples of such sound analysis include, without limitation, transient detection, root mean square ("RMS") detection, peak level detection, stereo phase difference, and discrete wavelet transform ("DWT"). More generally, it is contemplated that any sound analysis technique consistent with the functions described herein may be used in determining the acoustical characteristics of the recorded audio content. Such acoustic characteristics may then be used by the gaming program 140 to determine how gameplay will be affected based on the playback by the user of the recorded audio content. As an example, if the acoustic characteristics indicate that the recorded audio content contains mostly high frequencies, the gaming program 140 may identify the recorded audio content as a recording of a woman's scream within the virtual world. Of course, this example is provided for illustrative purposes only and without limitation, and one of ordinary skill in the art will quickly recognize that any number of other factors and measurements may be considered in lieu of or in addition to a measurement of spectral analysis in characterizing the recorded audio content.

Returning to the method 800, the gaming program 140 then receives a user selection of recorded audio content for playback in the virtual world (step 810). As discussed above, such playback may occur at various positions within the virtual world, including a position of the user's avatar and a position of a remote playback device in the virtual world. Upon receiving the selection of recorded audio content for playback, the gameplay program 140 plays the recorded audio content at a determined position within the virtual world, and alters one or more elements of gameplay based on the determined acoustic characteristics of the recorded audio content (step 815). As an example, assuming the acoustic characteristics of the recorded audio content indicate that the audio content is a recording of a woman screaming within the virtual world, the gameplay program 140 may alter elements of gameplay as if a woman had screamed at the playback position for the audio content (e.g., the NPC 515 shown in FIG. 5 may be distracted and investigate the source of the scream). Advantageously, by doing this, embodiments of the invention provide a dynamic gameplay environment, where the user may solve puzzles within the virtual world in various creative ways.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
providing a virtual world comprising speech audio content and environmental audio content;
receiving a first request to record a portion of environmental audio content at a first location in the virtual world, wherein the portion of environmental audio content relates to a first occurrence of an event within the virtual world;
upon receiving the first request, recording the portion of environmental audio content at the first location in the virtual world;
receiving a second request to playback the recorded portion of environmental audio content at a second location in the virtual world; and
upon receiving the second request, affecting, by operation of one or more computer processors, one or more elements of gameplay based on the playback of the recorded portion of environmental audio content, by causing a second occurrence of the event within the virtual world at the second location.

2. The method of claim 1, wherein the first request further specifies a beginning point in time and an ending point in time, and wherein the recording of the portion of environmental audio content is started at the beginning point in time, and wherein the recording of the portion of environmental audio content is stopped at the ending point in time.

3. The method of claim 1, wherein the first location in the virtual world is a position of an avatar associated with a user in the virtual world.

4. The method of claim 1, wherein the first request further specifies a direction from the first location in the virtual world in which to record the portion of environmental audio content.

5. The method of claim 1, wherein the first location in the virtual world is a position of a virtual recording device in the virtual world.

6. The method of claim 1, further comprising:
analyzing the recorded portion of environmental audio content to determine one or more acoustic characteristics of the recorded portion of environmental audio content; and
wherein affecting one or more elements of gameplay is further based on the determined one or more acoustic characteristics of the recorded portion of environmental audio content.

7. The method of claim 6, wherein the one or more acoustic characteristics of the recorded portion of environmental audio content include a measurement of frequency distribution.

8. A non-transitory computer-readable medium containing a program that, when executed, performs an operation comprising:
   providing a virtual world comprising speech audio content and environmental audio content;
   receiving a first request to record a portion of environmental audio content at a first location in the virtual world, wherein the portion of environmental audio content relates to a first occurrence of an event within the virtual world;
   upon receiving the first request, recording the portion of environmental audio content at the first location in the virtual world;
   receiving a second request to playback the recorded portion of environmental audio content at a second location in the virtual world; and
   upon receiving the second request, affecting, by operation of one or more computer processors, one or more elements of gameplay based on the playback of the recorded portion of environmental audio content, by causing a second occurrence of the event within the virtual world at the second location.

9. The non-transitory computer-readable medium of claim 8, wherein the first request further specifies a beginning point in time and an ending point in time, and wherein the recording of the portion of environmental audio content is started at the beginning point in time, and wherein the recording of the portion of environmental audio content is stopped at the ending point in time.

10. The non-transitory computer-readable medium of claim 8, wherein the first location in the virtual world is a position of an avatar associated with a user in the virtual world.

11. The non-transitory computer-readable medium of claim 8, wherein the first request further specifies a direction from the first location in the virtual world in which to record the portion of environmental audio content.

12. The non-transitory computer-readable medium of claim 8, wherein the first location in the virtual world is a position of a virtual recording device in the virtual world.

13. The non-transitory computer-readable medium of claim 8, the operation further comprising:
   analyzing the recorded portion of environmental audio content to determine one or more acoustic characteristics of the recorded portion of environmental audio content; and
   wherein affecting one or more elements of gameplay is further based on the determined one or more acoustic characteristics of the recorded portion of environmental audio content.

14. The non-transitory computer-readable medium of claim 13, wherein the one or more acoustic characteristics of the recorded portion of environmental audio content include a measurement of frequency distribution.

15. A system, comprising:
   a processor; and
   a memory containing a program that, when executed by the processor, performs an operation comprising:
      providing a virtual world comprising speech audio content and environmental audio content;
      receiving a first request to record a portion of environmental audio content at a first location in the virtual world, wherein the portion of environmental audio content relates to a first occurrence of an event within the virtual world;
      upon receiving the first request, recording the portion of environmental audio content at the first location in the virtual world;
      receiving a second request to playback the recorded portion of environmental audio content at a second location in the virtual world; and
      upon receiving the second request, affecting one or more elements of gameplay based on the playback of the recorded portion of environmental audio content, by causing a second occurrence of the event within the virtual world at the second location.

16. The system of claim 15, wherein the first request further specifies a beginning point in time and an ending point in time, and wherein the recording of the portion of environmental audio content is started at the beginning point in time, and wherein the recording of the portion of environmental audio content is stopped at the ending point in time.

17. The system of claim 15, wherein the first request further specifies a direction from the first location in the virtual world in which to record the portion of environmental audio content.

18. The system of claim 15, wherein the first location in the virtual world is a position of a virtual recording device in the virtual world.

19. The system of claim 15, the operation further comprising:
   analyzing the recorded portion of environmental audio content to determine one or more acoustic characteristics of the recorded portion of environmental audio content; and
   wherein affecting one or more elements of gameplay is further based on the determined one or more acoustic characteristics of the recorded portion of environmental audio content.

* * * * *